Feb. 23, 1943.　　　W. E. NEILSON　　　2,312,046
FROZEN CONFECTION MOLD
Filed Dec. 31, 1941
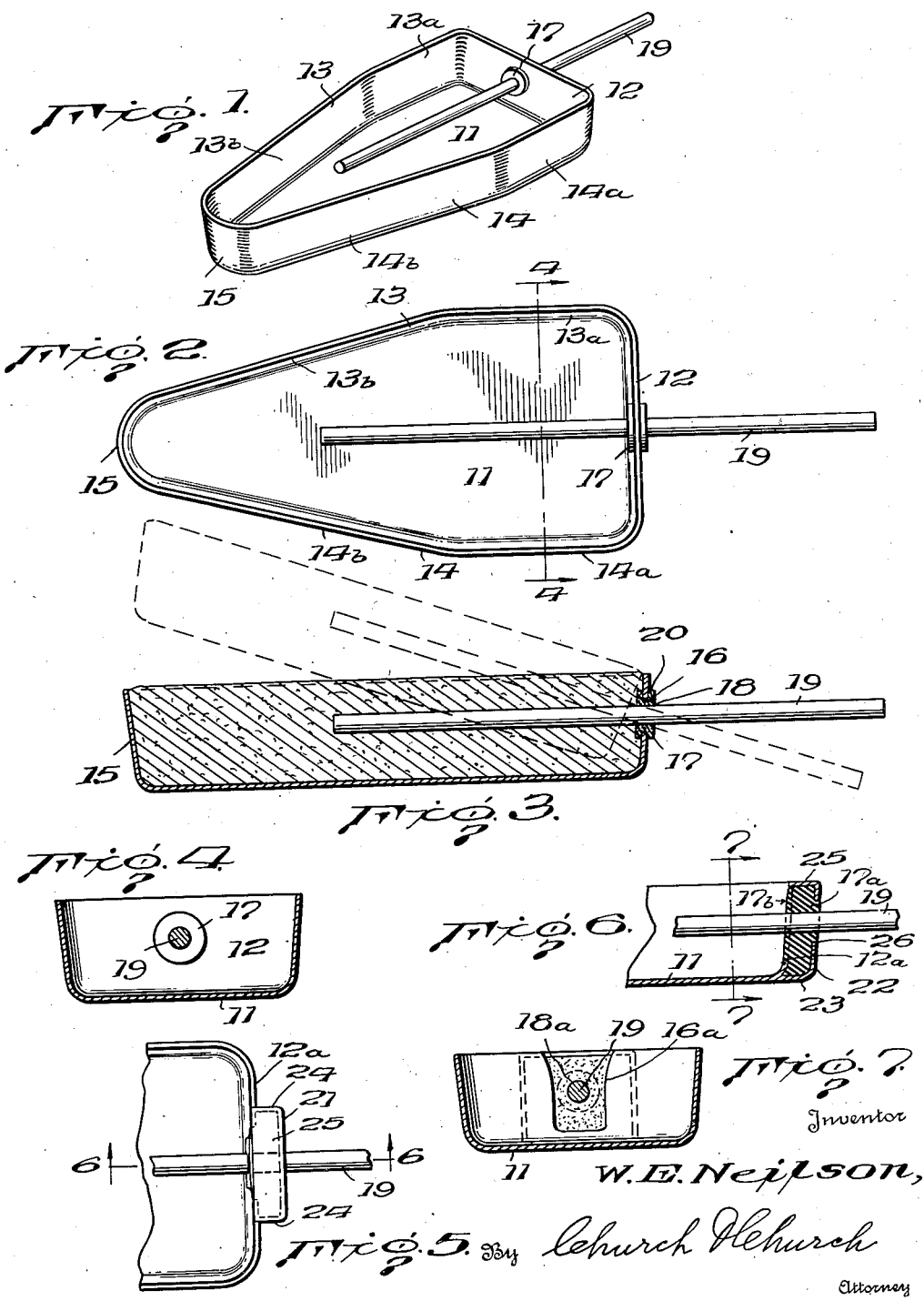
Inventor
W. E. Neilson,
By Church & Church
Attorney Patented Feb. 23, 1943

2,312,046

UNITED STATES PATENT OFFICE 2,312,046

FROZEN CONFECTION MOLD

Warren E. Neilson, York, Pa.

Application December 31, 1941, Serial No. 425,183

4 Claims. (Cl. 107—19)

This invention relates to molds, and more particularly to a mold pan especially adapted for the freezing of an edible confection about one end portion of a stick, the other end portion of the stick being usable as a handle.

One of the objects of the invention is to provide a mold for this purpose which is of simple and economical construction and which may be used effectively in conjunction with domestic refrigerators.

Further objects are to provide such a mold which will be durable, which can be used readily by anyone, and which avoids the breaking off of corners or other parts of the frozen confection.

Further objects and advantages of the invention, as well as the novel details of construction which constitute the invention, will be apparent from the following specification when read in conjunction with the accompanying drawing, in which Fig. 1 is a view in perspective, on a slightly reduced scale, of a mold embodying the invention;

Fig. 2 is a view in plan of the structure shown in Fig. 1, and on a slightly larger scale;

Fig. 3 is a view in vertical, longitudinal section of the structure shown in Figs. 1 and 2, illustrating the manner in which the frozen confection is removed from the mold;

Fig. 4 is a view in vertical, transverse section taken on line 4—4 of Fig. 2;

Fig. 5 is a fragmentary view in plan, similar to Fig. 2 but showing a modified form of resilient member constituting part of the end wall of the mold;

Fig. 6 is a fragmentary view in vertical longitudinal section taken on the line 6—6 of Fig. 5; and Fig. 7 is a view in vertical, transverse section taken on the line 7—7 of Fig. 6.

In general, the invention comprises a mold in the form of a pan open at its top, and preferably tapered, said pan having a substantially flat bottom, end walls, and side walls which are preferably substantially perpendicular to the one end wall for a considerable distance from such end wall and then converge to meet the other end wall, the side walls and the other end wall flaring slightly outwardly from their points of connection with the bottom, and the one end wall having a resilient, distortable member mounted therein and apertured to receive and engage the stick but permit sufficient distortion to enable the frozen confection to be swung upwardly relative to the mold and then to be drawn endwise therefrom as the handle end of the stick is slid through the distorted resilient member.

The mold body may be formed of any suitable material but is preferably formed of metal, or of a substantially rigid plastic material. It comprises a bottom 11 which is preferably substantially flat, an end wall 12, side walls 13 and 14 and another end wall 15, which is preferably, as shown, narrower than the end wall 12, all of the corners being preferably slightly rounded where the side and end walls meet each other or meet the bottom 11. The narrow end wall 15 is preferably, but not necessarily, curved as shown. In order that a tapered frozen confection may be formed, as illustrated, the side wall 13 is formed of a portion 13ª and a portion 13ᵇ, while the side wall 14 is formed of similar portions 14ª and 14ᵇ, the side wall portions 13ª and 14ª being substantially parallel, that is, perpendicular to the end wall 12, while the portions 13ᵇ and 14ᵇ converge from the points where they meet the portions 13ª and 14ª to the points where they meet the curved end wall 15. The parallel side wall portions 13ª and 14ª preferably constitute about one third of the side walls 13 and 14. The side walls 13 and 14 are flared outwardly from the points at which they join the bottom 12, as is clearly shown in Figs. 2, 4, 5 and 7. The end wall 15 is similarly flared outwardly as shown in Figs. 2 and 3, and the end wall 12 is preferably but not necessarily flared in a similar manner, as shown in Figs. 2, 5, 6 and 7.

It will be appreciated that the outward flaring of the side walls 13 and 14 and the narrow end wall 15 permits the frozen confection to be swung readily upwardly to the position indicated in Fig. 3 without the breaking off of pieces thereof from the lower edges. Likewise, the fact that both the portions 13ª and 14ª and the portions 13ᵇ and 14ᵇ are flared outwardly permits the frozen confection to be slid endwise, after it has been swung upwardly to the position shown in Fig. 3, without breaking or scraping off the lower corners of the wider end portion thereof. If it is not desired that the frozen confection be tapered it will be understood that the side walls 13 and 14 may be substantially parallel and end wall 15 may be of substantially the same width as end wall 12.

As shown in Figs. 1 to 4 the end wall 12 is formed with an opening 16 near its center which opening is preferably round and detachably receives a resilient member 17 of rubber or the like, which has an opening 18 therethrough to receive and contact a stick 19 but through which the stick 19 may be slid. The resilient member 17, as shown, is in the shape of a washer or ring having a peripheral groove 20 fitting and receiving the marginal portion of the end wall about the opening 16. It will be understood that the member 17 is of such shape and resiliency that it can be compressed and forced into the opening 16 and will be held thereby its inherent resiliency, and that after the stick 19 has been inserted in the opening 18 the member 17 may be distorted by movement of the stick 19 to the position shown in Fig. 3 without danger of separation of such member 17 from the end wall 12 and without such gripping action as would prevent the stick from being slid through it.

In Figs. 5 to 7 a modified form of resilient member has been shown. In this construction a resilient member 17ᵃ of sponge rubber or the like, and preferably having a substantially impervious facing portion or layer 17ᵇ, is detachably secured in place as a part of the end wall 12ᵃ. As shown the end wall 12ᵃ is formed with an opening 16ᵃ, extending from near the bottom of the wall up to, or substantially up to, the upper margin thereof. A cup-shaped housing 21 is secured to the outer face of the end wall 12ᵃ having a base 22 and a bottom wall, side walls, and preferably a top wall 23, 24 and 25, respectively, secured to the end wall 12ᵃ and forming with the end wall a recess into which the resilient member 17ᵃ can be forced and in which it will be held by reason of its inherent resiliency. The base 22 is formed with an opening 26, preferably circular and of considerably greater size than the cross-sectional area of the stick 19, and the resilient member 17ᵃ has an opening 18ᵃ therethrough to slidingly receive and contact the stick.

In using the mold, the stick is slid endwise into the mold to about the position shown in Figs. 1 and 2, after which the mold is substantially filled with the desired flavored liquid and is placed in a freezing compartment, such as those normally embodied in household refrigerators. When the liquid has frozen and it is desired to remove it from the mold the handle portion of the stick is swung downwardly relative to the mold to approximately the position shown in Fig. 3, and then pushed through the resilient member 17 or 17ᵃ until the portion of the handle adjacent to the frozen confection body can be grasped and the remaining portion of the handle can be pulled through the resilient member.

The invention having been described with respect to two embodiments thereof, it is to be understood that what I claim as new and desire to secure by Letters Patent is:

1. A mold for the freezing of stick confections, comprising a body having therein a recess open at the top and defined by a bottom wall, side walls and end walls, one of said end walls having an opening therein, and an elastic member secured in said opening and having an opening therethrough to slidingly receive and support a handle stick, said member being sufficiently resilient to permit the distortion thereof incident to swinging a frozen confection upwardly until the end of the confection remote from the handle stick is raised above the opposite end wall of the mold and while so distorted permit the stick to be slid therethrough.

2. A mold for the freezing of stick confections, comprising a body having a recess therein open at the top and defined by a bottom wall, side walls and end walls, said side walls and one end wall flaring slightly outwardly from their lines of juncture with the bottom wall to their upper edges, the other of said end walls having an aperture therethrough, and an elastic member secured in and filling said aperture and having an opening adapted to slidingly receive a handle stick, said opening being of substantially less cross-sectional area than said aperture to permit the stick to be tilted in said elastic member to raise a frozen confection thereon above the opposite end wall of the mold.

3. A mold for the freezing of stick confections, comprising a substantially rigid body having a recess therein open at the top and defined by a substantially flat bottom wall, a wide end wall, a narrow end wall and side walls, said side walls and narrow end wall being inclined slightly outwardly from the perpendicular to said bottom wall at each point of the lines of juncture with said bottom wall, each of the side walls having a portion substantially perpendicular to said wide end wall for a material distance from its point of juncture with said wide end wall and a portion converging toward the corresponding portion of the other side wall to join said narrow end wall, and a distortable, apertured, stick-receiving resilient member mounted in said wide end wall.

4. A mold for the freezing of stick confections, comprising a body having a recess therein open at the top and defined by a substantially flat bottom wall, a wide end wall, a narrow end wall and side walls, said side walls and narrow end wall being inclined slightly outwardly from the perpendicular to said bottom wall at each point of the lines of juncture with said bottom wall, each of said side walls comprising a first portion connecting with said narrow end wall and a second portion connecting with said first portion and with said wide end wall, said first portions of said side walls diverging from their point of juncture with said end wall, said wide end wall having an aperture therein, and a distortable, apertured, stick-receiving resilient member secured in said aperture by reason of its inherent resilient.

WARREN E. NEILSON.